United States Patent
Norrie (10) Patent No.: US 7,634,586 B1
(45) Date of Patent: Dec. 15, 2009

(54) DEVICE FOR CONCURRENT LIMIT VALIDITY CHECK

(75) Inventor: Christopher I. W. Norrie, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 172 days.

(21) Appl. No.: 11/422,190

(22) Filed: Jun. 5, 2006

(51) Int. Cl.
*G06F 3/00* (2006.01)
*G06F 13/00* (2006.01)

(52) U.S. Cl. .................. 710/3; 710/5; 710/316
(58) Field of Classification Search .......... 710/5, 710/3, 316
See application file for complete search history.

(56) References Cited

U.S. PATENT DOCUMENTS

| | | | |
|---|---|---|---|
| 4,638,431 A | 1/1987 | Nishimura | |
| 4,641,302 A | 2/1987 | Miller | |
| 5,247,691 A | 9/1993 | Sakai | |
| 5,369,762 A * | 11/1994 | Wolf | 707/7 |
| 5,761,726 A | 6/1998 | Guttag et al. | |
| 5,790,814 A * | 8/1998 | Gan et al. | 710/314 |
| 5,915,097 A * | 6/1999 | Chao | 709/238 |
| 6,005,863 A | 12/1999 | Deng et al. | |
| 6,378,047 B1 | 4/2002 | Meyer | |
| 6,490,288 B1 | 12/2002 | Lin et al. | |
| 6,584,514 B1 * | 6/2003 | Smith | 710/26 |
| 6,810,037 B1 | 10/2004 | Kalapathy et al. | |

* cited by examiner

*Primary Examiner*—Henry W. H. Tsai
*Assistant Examiner*—Juanito C Borromeo
(74) *Attorney, Agent, or Firm*—Glass & Associates; Michael R. Hardaway; Kenneth Glass (57) ABSTRACT

A device and method are disclosed for performing a limit address check validation in a switching device. The device includes a multiplexer that is enabled to select content from a base address register in an array of base address registers, a comparator enabled compare a base address in the content with a target address from a packet, and a comparator enabled to concurrently compare a limit address in the content with the target address and the output of the limit address comparator. The method includes receiving the target address, locating a matching base address in an array of base address registers, concurrently comparing the target address with a limit address associated with the matching base address, and indicating if said target address is not valid.

9 Claims, 6 Drawing Sheets

DEVICE FOR CONCURRENT LIMIT VALIDITY CHECK

BACKGROUND OF THE INVENTION

Peripheral Component Interconnect (PCI) Express is an Input/Output system that implements a serial, switched-packet, point-to-point communication standard at the system level. PCI Express has achieved many advantages over the prior shared parallel bus systems, such as quality of service (QoS), high speed peer-to-peer communication between external devices, adaptability, and low pin counts. The basic PCI Express architecture includes a root complex, a PCI Express switch chip, and various external devices. So far, PCI Express switching has only been implemented in a limited number of external devices.

One three-port PCI Express serial switch performs simultaneous comparisons of the target address value of an incoming data packet with the addresses of all possible directly-connected external devices. Since each external device's addressing is defined by a base address and a limit address, there are six comparisons performed for each port. Communication packets can arrive at any of the three ports, so as many as 18 comparisons can be required to be performed, in parallel, within the PCI Express switch, requiring the implementation of sufficient comparators to accomplish the simultaneous comparisons.

As a result of the need to couple more devices to PCI Express systems, there is a need for switches that can accommodate a higher number of external devices. Thus, for example, for a PCI Express switch to accommodate 16 external devices, it would require 16 downstream ports and an upstream port. For a PCI Express switch to have 16 ports or more, the total number of comparisons that would be needed for each packet routing using conventional switch architecture can be as many as 512, or more. Switches having 512 comparators are undesirable since comparators take up chip space, consume power, and increase latency of the system.

Thus, there is a need for a method and apparatus that will accommodate rapid address searching in support of connection of a large number of external devices to a serial switch without using an exponentially increased number of comparators and registers and without incurring undue latency.

SUMMARY OF THE INVENTION

A method for limit address checking is presented in order to support rapid address searching. The method is implemented in a PCI Express serial switch and accommodates a large number of ports without using the expected exponentially-increased number of comparators and registers. In addition, the device avoids the latency of delayed or non-concurrent limit address checking with each base address comparison by performing the limit check concurrently with base address matching with the target address.

A device and method are disclosed for performing a concurrent limit address check validation in a switching device. The device includes a multiplexer that is enabled to select content from a base address register in an array of base address registers, a comparator enabled compare a base address in the content with a target address from a packet, and a comparator enabled to concurrently compare a limit address in the content with the target address and the output of the limit address comparator is enabled to inhibit transmission of the communication packet. The method includes receiving the target address, seeking and locating a matching base address in an array of base address registers, concurrently determining the target address to be valid by comparing it with a limit address associated with the matching base address, and nullifying the match if the target address is greater than the limit address.

By using a concurrent limit address check, the method and apparatus of the present invention allow for quickly and accurately locating a matching address in a sorted list of base addresses in an array of base address registers. Also, the concurrent limit checking avoids the latency inherent in a non-concurrent limit check.

These and other advantages of the present invention will become obvious to those of ordinary skill in the art after having read the following detailed description of the preferred embodiments, which are illustrated in the various drawing figures.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
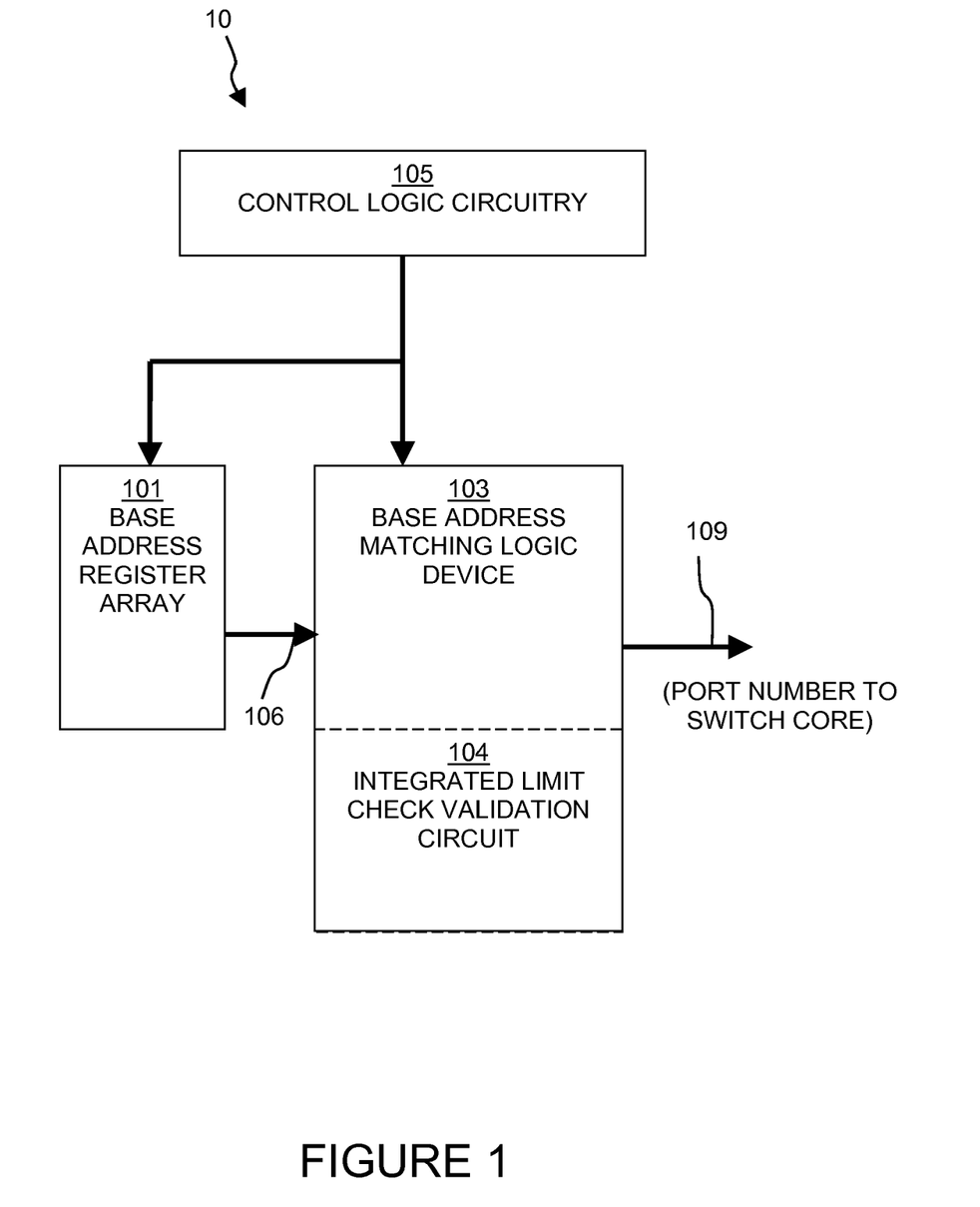
FIG. 1 illustrates a block diagram of a routing device for a multi-port switching device that includes control logic circuitry, a base address sorting device, and an address matching logic device with an integrated limit check validation circuit in accordance with an embodiment of the present invention.

FIG. 1 illustrates a block diagram of a routing device for a PCI Express multi-port switch. One embodiment of the present invention is intended to function in a PCI Express switch that is enabled to sort base register addresses into an ascending or descending order.

In FIG. 1, routing device 10 includes control logic circuitry 105, a base address register array 101, a base address matching logic device 103, and a limit check validation circuit 104.

In this embodiment of the present invention, routing device 10 is located at each port of the multi-port device to route a new communication packet into the correct port and thus to the correct external device. In the present embodiment, base address matching logic device 103 generates an output that is coupled to limit check validation circuit 104. Control logic circuitry 105 is electrically connected to and directs the functioning of base address register array 101, base address matching logic device 103, and limit check validation circuit 104.

It is noted here that this discussion of embodiments of the present invention refers to use in a Peripheral Component Interconnect Express (PCIe) switch operating as part of a PCI Express bus. However, implementation of embodiments of the present invention is not limited to such applications.

PCI Express communications, it is noted, are switched-packet serial communications, meaning that information communicated in PCI Express is contained in a packet that includes a header having an address and, if data is being communicated, a payload. Because a header is added at a transaction layer in the PCI Express structure, a packet containing data and a header is commonly referred to as a transaction layer packet (TLP).

It is also noted that a "base address register," as referred to in this description, denotes a register that holds a base address, a limit address, and a port identifier, either a port number or a port name. Since a bus number can also be used to route some types of packets in a PCI Express serial switch, a bus number can be included in the contents of a base address register.

In one implementation of a PCI Express switch, an array of base address registers, one register for each other port in a switching device, is assigned to each port connected to a device with which the PCI Express switch communicates. At each port in a three-port switch, for example, there are three base address registers for a total of nine. In a large port-count switch, such as one having sixteen ports, for example, each port has an array of sixteen base address registers, for a total of 256. Each base address register contains a port name and the base and limit addresses assigned to external devices connected, either directly or indirectly, to its named port. The array of base address registers is encountered by the routing of an incoming PCI Express packet and the incoming packet is directed to the identified port of the base address register whose address contents encompass the target address contained in the packet's header.

For a communication packet to be routed to a device by the switch, the address in the packet header must equal or lie between the base address and the limit address assigned to the port that is connected to the device. Each port in a PCI Express switch is connected to only one external device but an external device can be another switch or a bridge connected to additional devices.

A PCI Express switch, in this embodiment of the present invention, is able to dynamically reassign addresses and address ranges to the ports in the switch. One example of a reason to dynamically reassign addresses is a requirement by the operating system to increase a memory allocation, such as when a software application discovers a need for more memory space than was allocated to it at system start up.

Another example is a hot-switched occurrence, such as in the example of a One-GByte flash memory device being plugged into a USB port in place of a 256 MByte device, all while the associated computer is running. The base address and the limit address are, in this example, changed in the base address register associated with the USB port. The increased memory size in this example may require a limit address that is outside the range of addresses available above the existing base address. The base address must then be changed to an address with an associated address space sufficient to encompass the new allocation. Reassignment is accomplished with a configuration command packet.

Embodiments of the present invention are able to accommodate reassignment of addresses in the base address registers by the use of commands contained in configuration packets. A configuration packet, it is noted, is one of the various types of packets defined in PCI Express. The others include memory read/write, input/output read/write, and completions. Some types of packets that request an action, such as a base address reconfiguration, require a response that indicates completion of the action and a possible product of the action, such as data. A response can also be a system message.

It is noted here, again, that embodiments of the present invention enhance the performance of serial switches by enabling a rapid binary search of base addresses. The rapid binary search is enabled by the sorting of base addresses into a descending or ascending order. The insertion of new base addresses and the subsequent sorting of the base addresses held in the base address registers is described fully in co-pending patent application entitled "METHOD AND DEVICE FOR BASE ADDRESS SORTING AND ENTRY INTO BASE ADDRESS REGISTERS", filed Mar. 31, 2006, assigned Ser. No. 11/395,918, and incorporated by reference herein in its totality.

In one embodiment of the present invention, when a configuration command packet containing a new base address intended for a base address register associated with a port arrives at the PCI Express switch, the new address is inserted into the correct slot and the array of base address registers is sorted in a predetermined order. During normal packet communication operations, base address matching logic device 103 uses the sorted list of base address registers to determine which external device is the intended target of each incoming packet containing a target address. A search for the proper base address register involves a comparison of the packet header target address and the base addresses contained in the base address registers. When the base address registers are sorted in descending order, for example, the first base address register encountered whose base address is smaller than the target address is the base address register of interest. As noted in the co-pending patent application referenced above, this avoids a comparison of each incoming target address with every base address in every base address register.

Figure 2:
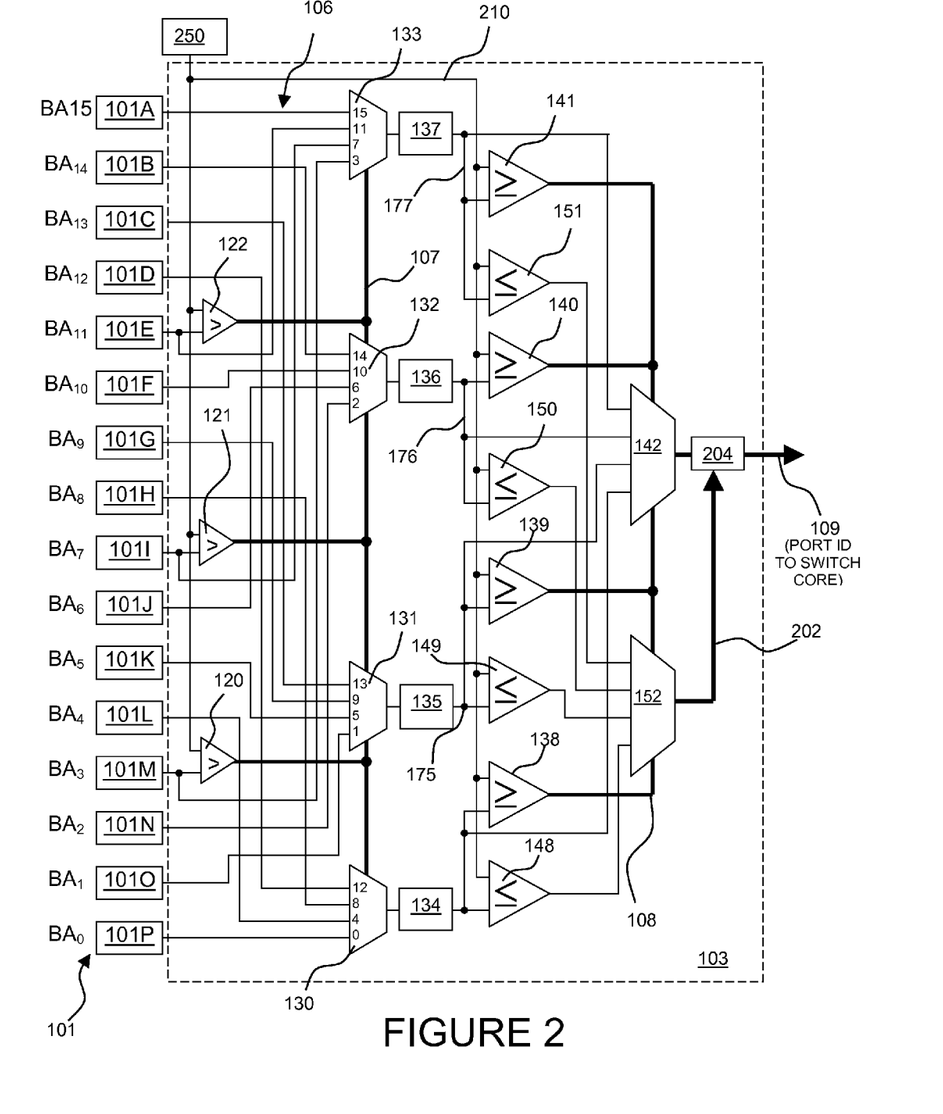
FIG. 2 illustrates a logical diagram of an address matching logic device with an integrated limit check validation circuit in accordance with an embodiment of the present invention.

Referring now to FIG. 2, routing device 10 is shown in more detail. In this embodiment of the present invention, routing device 10 includes base address register array 101, address matching logic circuit 103, and concurrent limit check validation circuit 104. Routing device 10 includes, in this embodiment, register/buffer 250 which is electrically coupled 210 to, and can be read by, address matching logic circuit 103. Register/buffer 250 holds the target address received from the header of a communication packet. Address matching logic circuit 103 is enabled to output 109 a port identifier, either a name or a number, associated with an address match found in a base address register in the array 101A-101P.

Base address registers 101A-101P, in the base address register array 101, are each electrically connected 106 to address matching logic circuit 103. Address matching logic circuit 103 is, in turn, electrically connected to limit check validation circuit 104. In this embodiment of the present invention, concurrent limit check validation circuit 104 is implemented, logically within address matching circuit 103, as an array of limit address comparators 148-151, multiplexer 152, and limit checking device 204.

Referring still to FIG. 2, base address register array 101 has sixteen base address registers 101A through 101P, containing base addresses $BA_{15}$ through $BA_0$, respectively. It is noted that the switching device, here illustrated with sixteen base address registers in each port's routing device, is a seventeen port switch, though embodiments of the present invention can be implemented in switching devices with any number of ports. The switch is implemented here with one upstream port and sixteen downstream ports. Because a communication packet, whose header target address indicates routing through the upstream port, is handled differently from other packets, the base address register holding address and port information associated with the upstream port is not shown in base address register array 101. Base address register array, in this illustration, contains sorted base address and port information only for downstream ports.

It is noted that the base address designations $BA_0$, $BA_1$, etc through $BA_{15}$ are used herein to denote base address register contents that are sorted on the numerical value of the base address. These designations do not imply any specific values for base addresses, limit addresses, port names, or bus numbers.

Similarly, the number of illustrated base address registers in base address register array 101 is shown solely for the purpose of illustration. The specific number of base address registers used in implementations of embodiments of the present invention is dependent on the number of ports in the applicable switching device.

In FIG. 2, the location of $BA_{15}$, the largest numerical value base address, is shown in the topmost, logically, base address register. This is to illustrate that embodiments of the present invention use an array of base addresses that are sorted. In this embodiment, the sorting is into a logically descending order. In another embodiment, another sort order is used.

Again referring to FIG. 2, base address register array 101 is shown connected 106 to base address matching logic element 103. Base address matching logic element 103 is shown with a set of first phase comparators 120, 121, and 122. The outputs of the first-phase comparators control the input selection of a set of first-phase multiplexers 130, 131, 132, and 133. The outputs of the first-phase multiplexers are read into buffers 134, 135, 136 and 137. First-phase multiplexers 130-133 are "register content" multiplexers in that they are enabled to select and forward the content of a base address register. In the present embodiment register content multiplexers 130-133 forward the entire contents of a selected base address register.

First-phase comparators 120, 121, and 122 are enabled to compare the contents of a specific base address register with a target address in a communication packet header and each issues a "true" output indication if the target address is numerically larger than the base address being compared to. In this embodiment, the target address is held in register 250. Each comparator in the first-phase set is connected to and has one of its inputs from register 250 and takes the other input from one of the base address registers in base address register array 101. The specific register to which each comparator is connected is based on a specific intersection interval.

Base address register array 101 includes, as noted above, 16 base address registers whose contents are sorted in the decreasing order of base address from top to bottom as $BA_{15}$, $BA_{14}$, $BA_{13}$, ..., $BA_1$, $BA_0$. Base address register array 101 is, in this embodiment of the present invention, divided into 4 intersection intervals each having 4 base address registers. More particularly, the first interval includes base address registers 101P through 101M, containing base addresses $BA_0$ to $BA_3$. The second interval begins with base address register 101L holding $BA_4$ and ends with 101I holding $BA_7$. The third interval begins with base address register 101H holding $BA_8$ and ends with base address register 101E holding $BA_{11}$. The fourth interval begins with base address register 101D holding $BA_{12}$ and ends with base address register 101A holding $BA_{15}$.

In one embodiment of the present invention, as illustrated in FIG. 2, the number of registers in the base address register array 101 is used to determine the intersection interval. In this embodiment, the interval, in number of registers included, is determined by the square root of the total number of ports in the switching device, $N^{(1/2)}$, which determines the number of registers in the base address register array. In this embodiment, $N^{(1/2)}$ is 4, where N is the number of registers in the base address register array. This results in 3 ($N^{(1/2)}-1$) first-phase comparators.

In another embodiment, however, the number of registers defining the intersection interval is the result of taking $Log_2(N)$. In further discussion herein, "logarithm" is used to designate any logarithmic function or root function used to determine the size of an intersection interval.

The topmost base address register in each interval, containing the numerically largest base address in the interval, is electrically coupled as one input to a first-phase comparator. More particularly, in the first interval base address register 101M, here having largest base address $BA_3$, is electrically connected to an input of first-phase comparator 120. In the second interval, base address register 101I, containing the interval's largest base address $BA_7$, is electrically connected to an input of first-phase comparator 121. In the third interval, base address register 101E, containing the interval's largest base address $BA_{11}$, is electrically connected to an input of first-phase comparator 122. Thus, the number of first-phase comparators is equal to the number of intervals minus 1. Accordingly, in general, there are $N^{(1/2)}-1$ first-phase comparators for array of base address registers 101, where, again, N equals the number of registers in the array.

It is noted here that embodiments of the present invention can be implemented in integrated circuits formed in silicon chips. The nature of such implementation lends some embodiments to seek optimal sizes of attendant features, such as multiplexers and comparators. In an embodiment discussed herein, one optimal size of a multiplexer can be found at four inputs. Hence, in one embodiment of the present invention, the number of selector phases and comparators can be derived from a root function that results in multiplexers of four inputs. In another embodiment, as noted above, other functions can be used to derive a relationship between phases and features.

As discussed above, register 250, containing the target address of interest, is electrically connected to the other input of each comparator 120-122. First-phase comparators 120, 121, and 122 compare the target address, in register 250, to base addresses $BA_3$, $BA_7$, and $BA_{11}$, respectively. The output of each first-phase comparator 120-122 depends on whether the target address in register 250 is greater numerically than the respective address. In the present embodiment, each first-phase comparator issues a "true" output if the target address is greater than the associated base address in each first-phase comparator's connected base address register. In another embodiment, the comparators issue a "false" output if the target address is not greater than the respective base address. Still other embodiments produce differing combinations of target address/base address relationships in relation to true/false outputs.

Still referring to FIG. 2, the outputs of first-phase comparators 120-122 control the input selection of first-phase multiplexers 130, 131, 132, and 133. Multiplexers 130-133 select the inputs to second-phase base address comparators 138, 139, 140, and 141 and to limit address check comparators 148-151. In this embodiment of the present invention, first-phase comparators 120-122, first-phase multiplexers 130-133, second-phase base address comparators 138-141, and second-phase multiplexer 142 constitute the major components of base address matching circuit 103. Limit address check comparators 148-151, limit check multiplexer 152, and limit check device 204 constitute the major components of limit check validation circuit 104.

First-phase multiplexers 130-133 are, in this embodiment of the present invention, four-input multiplexers. Each input to each of the first-phase multiplexers is connected to a single base address register, one in each of the intervals discussed above. Specifically, in this embodiment of the present invention, first-phase multiplexer 130 takes its inputs from base address register 101P in the bottom-most interval, base address register 101L in the next interval, base address register 101H in the interval after that, and from 101D in the topmost interval. The next first-phase multiplexer 131 takes its inputs from the next set of base address registers; specifically, base address register 101O in the bottom-most interval, base address register 101K in the next interval, base address register 101G in the interval after that, and from 101C in the topmost interval. The next first-phase multiplexer 132 takes its inputs from the next set of base address registers; specifically, base address register 101N in the bottom-most interval, base address register 101J in the next interval, base address register 101F in the interval after that, and from 101B in the topmost interval. The topmost first-phase multiplexer 132 takes its inputs from the next set of base address registers; specifically, base address register 101M in the bottom-most interval, base address register 101I in the next interval, base address register 101E in the interval after that, and from 101A in the topmost interval.

In FIG. 2, the outputs of first-phase comparators 120-122 are shown connected to a bus connecting first-phase multiplexers 130-133. The outputs of first-phase comparators 120-122 determine which of the inputs each first-phase multiplexer uses to compare with the contents of register 250. In FIG. 2, each first-phase multiplexer is shown with indications of which base address is available on each input. First-phase multiplexer 130, for example, is shown with 0, 4, 8, and 12, indicating that base addresses $BA_0$, $BA_4$, $BA_8$, and $BA_{12}$, respectively, are the base addresses to be read on each input. First-phase multiplexer 131 has 1, 5, 9, and 13 to indicate that base addresses $BA_1$, $BA_5$, $BA_9$, and $BA_{13}$, respectively, are the base addresses to be read on each input. Similarly, first-phase multiplexer 132 has 2, 6, 10, and 14 to indicate base addresses $BA_2$, $BA_6$, $BA_{10}$, and $BA_{14}$, and first-phase multiplexer 133 has 3, 7, 11, and 15 to indicate base addresses $BA_3$, $BA_7$, $BA_{11}$, and $BA_{15}$.

In an example of operation of the first-phase comparators and the second-phase multiplexers, a communication packet arrives at a port with a target address $TA_{NEW}$ in its header that is numerically between the base addresses represented by $BA_8$ and $BA_9$. $TA_{NEW}$ is written into register 250. Each first-phase comparator 120, 121, and 122, compares $TA_{NEW}$ with each first-phase comparator's respective specific register. $TA_{NEW}$ is larger than $BA_8$, thus it is also larger than $BA_3$ in base address register 101M connected to first-phase comparator 120. First-phase comparator 120, therefore, outputs a "true" indication. $TA_{NEW}$ is also larger than $BA_7$ in base address register 101I connected to first-phase comparator 121, so first-phase comparator 121 also outputs a "true" indication. However, $TA_{NEW}$ is smaller than $BA_9$, so it is also smaller than $BA_{11}$ in base address register 101E connected to first-phase comparator 122, so first-phase comparator 122 outputs a "false" indication.

The combination of outputs from the first-phase comparators 120-122 determines which input is accepted by the first-phase multiplexers 130-133 via control bus 107. In this embodiment of the present invention, a "true, true, false" output from the first-phase comparators indicates that, if a matching address is to be found for the new target address $TA_{NEW}$, it will be found in the interval above base address register 101I; 101H up to and including base address register 101E. If the first-phase comparator output had been "false, false, false", the first interval 101P-101M would have been indicated. If the output had been "true, false, false", the second interval 101L-101I would have been indicated. If the output had been "true, true, true", the topmost interval, 101D-101A, would have been indicated.

Because, in this example, the third interval 101H ($BA_8$)-101E ($BA_{11}$) is indicated, the output of first-phase comparators 120-122 causes the first-phase multiplexers 130-133 to read from the inputs connected to base address registers in the indicated interval. First-phase multiplexer 130 reads from its third input connected to base address register 101H ($BA_8$), first-phase multiplexer 131 reads from its third input connected to base address register 101G ($BA_9$), first-phase multiplexer 132 reads from its third input connected to base address register 101F ($BA_{10}$), and first-phase multiplexer 133 reads from its third input connected to base address register 101E ($BA_{11}$). The contents of each of the third interval registers is written to buffers 134-137, connected to each output of the first-phase multiplexers 130-133, respectively.

It is noted here that the implementation of base address matching with a multiphase comparator and multiplexer decreases the use of chip space, exponentially, over prior solutions, especially in larger port-count switching devices. It is also noted that higher port-count switching devices can benefit from the use of other root functions. In a 64 port switching device, for example, the square root of eight would result in seven first-phase comparators and eight first-phase multiplexers of eight inputs each. However, the cube root of 64 ($N^{(1/3)}$) is 4. Using four as the intersection interval count results in three first-phase comparators with four first-phase multiplexers, four second-phase base address comparators with four second phase multiplexers, and four third-phase comparators with one third-phase multiplexer, with each phase of multiplexer having four inputs. As noted earlier, other functions can be utilized in seeking an intersection interval count.

Referring again to FIG. 2, the outputs of first-phase multiplexers 130-133 are connected to buffers 134-137, respectively. Each buffer 134-137 is enabled to be read as an input to second-phase base address comparators 138-141, respectively and as an input to limit check comparators 148-151, respectively. The other input to each second-phase base address comparator and also to each limit check comparator is connected so as to read register 250 which contains, in the current example, new target address $TA_{NEW}$. Second-phase base address comparators 138-141, it is noted, output a true indication on a greater-than-or-equal-to comparison. Limit check comparators 148-151 output a true indication on a less-than-or-equal-to comparison.

Continuing the current example, second-phase base address comparator 138 compares $TA_{NEW}$ with base address $BA_8$. Second-phase base address comparator 139 compares $TA_{NEW}$ with base address $BA_9$, second-phase base address comparator 140 compares $TA_{NEW}$ with base address $BA_{10}$, and second-phase base address comparator 141 compares $TA_{NEW}$ with base address $BA_{11}$. $TA_{NEW}$ is larger than $BA_8$ but smaller than $BA_9$, $BA_{10}$, and $BA_{11}$. Therefore, second-phase base address comparator 138 outputs a true, but second-phase base address comparators 139-141 output false indications. Similar to the action of the first phase comparators 120-122, the outputs of second-phase base address comparators 138-141 control the input selection of multiplexer 142 via control bus 108.

As shown in FIG. 2A, multiplexer 142 is also a four-input multiplexer, taking its inputs from the buffers 134-137 that contain the outputs of first-phase multiplexers 130-133. Again, the outputs of second-phase base address comparators 138-141 control the input selection of multiplexer 142.

In the present example, the "true, false, false, false" output of second-phase base address comparators 138-141 cause multiplexer 142 to accept the contents of register 134 as input. Register 134, as discussed above, contains the contents of base address register 101H, which include base address $BA_8$. In this way, the contents of base address register 101H are output by base address matching logic element 103 to limit check device 204. In addition to $BA_8$, the contents of base address register 101H include a limit address and a port name or number.

Concurrently with the comparisons accomplished by base address comparators 138-141, $TA_{NEW}$ is compared with the limit address contents of buffers 134, 135, 136 and 137 by limit check comparators 148, 149, 150 and 151, respectively. As noted above, the limit check comparators 148-151 output a "true" indication when $TA_{NEW}$ is numerically smaller than or equal to the limit address associated with the respective base address and a "false" indication when $TA_{NEW}$ is larger than the limit address. It is noted that $TA_{NEW}$ is considered to be invalid when it is larger than the limit address associated with the matching base address. The "true" and "false" outputs of limit check comparators 148-151 are connected to the inputs to limit check multiplexer 152.

As noted above, the output indications of second-phase base address comparators 138-141 control the input selection of second-phase multiplexer 142 via control bus 108. The output indications of second-phase base address comparators 138-141 also control the input selection of limit check multiplexer 152. With each combination of outputs of the second-phase base address comparators 138-141, the input selection of the second-phase multiplexer 142 and the input selection of the limit check multiplexer 152 are coordinated. If second-phase multiplexer 142 selects its first input, the input selection of the limit check multiplexer 152 is also to the first input. If second-phase multiplexer 142 selects the second, third, or fourth input, limit check multiplexer 152 also selects the second, third, or fourth input, respectively. In this manner, $TA_{NEW}$ is always compared to a base address and a limit address that are associated with the same port in the switching device, and contained in the same base address register.

Continuing the present example in reference to FIG. 2 wherein base address $BA_8$, contained in base address register 101H, is determined to be the matching base address, the limit address also contained in base address register 101H is compared to target address $TA_{NEW}$ by limit check comparator 148. Concurrently, $TA_{NEW}$ is compared to base address $BA_9$, contained in base address register 101G, and the limit address also contained in base address register 101G is compared to target address $TA_{NEW}$ by limit check comparator 149. Similarly, $TA_{NEW}$ is compared to base address $BA_{10}$, contained in base address register 101F, and the limit address also contained in base address register 101F is concurrently compared to target address $TA_{NEW}$ by limit check comparator 150, and $TA_{NEW}$ is compared to base address $BA_{11}$, contained in base address register 101E, and the limit address also contained in base address register 101E is compared to target address $TA_{NEW}$ by limit check comparator 151.

Because of the coordination of inputs to second-phase multiplexer 142 and limit check multiplexer 152 by means of control bus 108 in the present embodiment, the matching base address selected by second-phase multiplexer 142 is accompanied by the validity check selected by limit check multiplexer 152. In the present example, $TA_{NEW}$ is matched with base address $BA_8$, and is concurrently checked against the limit address associated with $BA_8$. If $TA_{NEW}$ is less than or equal to the limit address associated with base address $BA_8$, then limit check multiplexer sends a "true" indication to limit check device 204 and $TA_{NEW}$ is processed as a valid target address. If $TA_{NEW}$ is greater than the limit address associated with base address $BA_8$, then limit check multiplexer sends a "false" indication to limit check device 204 and $TA_{NEW}$ is processed as an invalid target address.

In the fashion described above, the determination of a matching base address for $TA_{NEW}$ is always concurrent with the determination of the validity of $TA_{NEW}$. In this way, no latency is incurred in the limit check validation.

It is noted that, in the above example, if the indications output by second-phase base address comparators 138-141 had been different, a different input to multiplexers 142 and 152 would have been read for forwarding to the switch core. A "true, true, false, false" indication would have caused base address multiplexer 142 to read from buffer 135 and limit check multiplexer 152 to read from limit address comparator 149. A true, true, true, false" indication would have caused the multiplexer 142 to read the contents of buffer 136 and limit check multiplexer 152 to read from limit address comparator 150, and a "true, true, true, true" would have caused the multiplexer to read buffer 137 and limit check multiplexer 152 to read from limit address comparator 151.

Limit check device 204 receives the outputs of both second-phase multiplexer 142 and limit check multiplexer 152. Limit check device 204 can be a circuit or a process implemented by a circuit. If limit check device 204 receives a "true" indication from limit check multiplexer 152, the port identifier associated with the matching base address is forwarded to the switch core for processing the packet. If limit check device 204 receives a "false" indication from limit check multiplexer 152, the packet is processed as an invalid packet according to the applicable system in which the switching device is operating.

Figure 3:
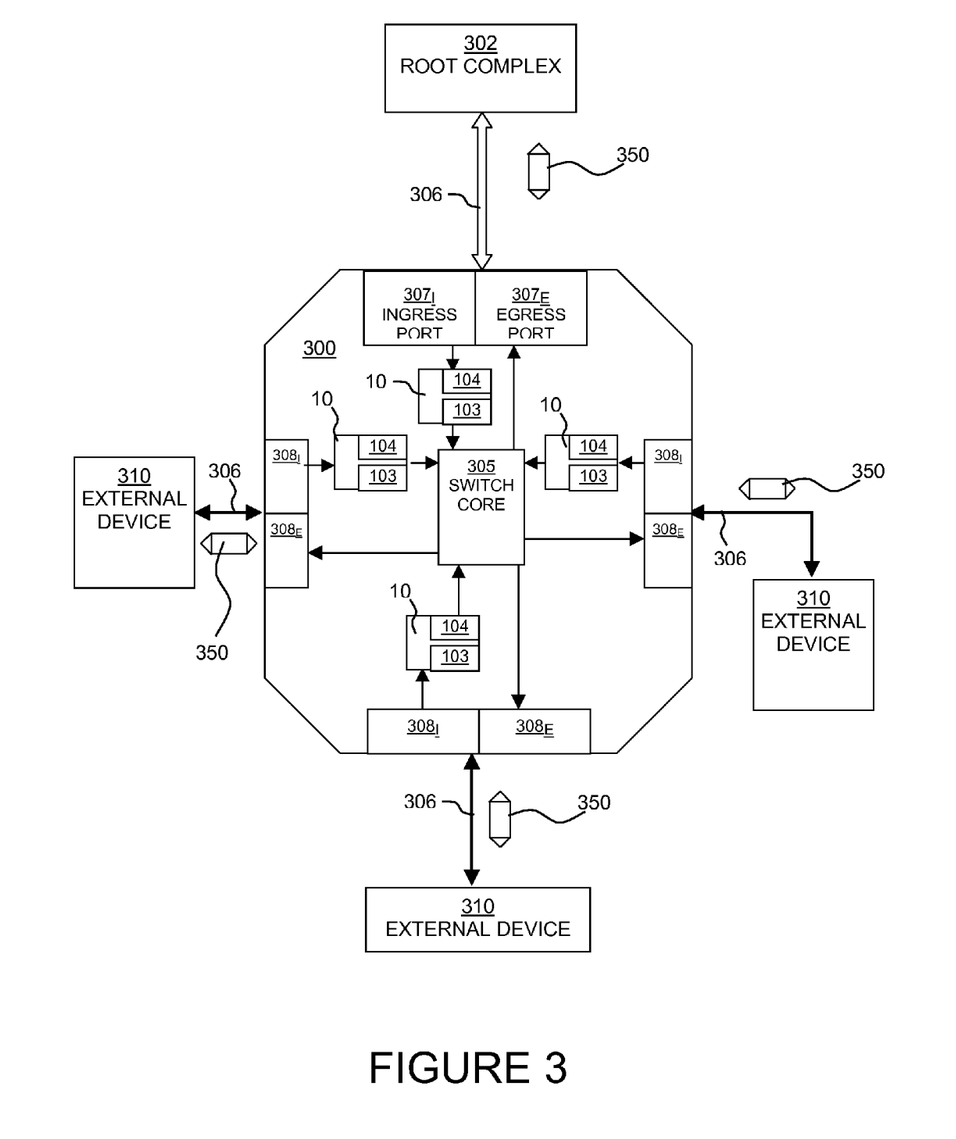
FIG. 3 illustrates a block diagram of a switching device in accordance with an embodiment of the present invention.

Now referring to FIG. 3, a block diagram of a switching device 300 is shown. In this embodiment of the present invention, the switching device uses routing device 10 of FIG. 1 at each port to facilitate communication of the external devices 310 connected to the switch. In another embodiment, routing device 305 is centrally implemented with switch core 305.

In one embodiment of the present invention, switching device 300 is a PCI Express switch. Switching device 300 employs routing device 10 that contains address matching logic device 103. Address matching logic device 103 is electrically connected to a switch core 305. Switching device 300 communicates with external devices 310 via PCI Express links 306. As discussed previously, the term PCI Express as used in the present invention includes devices, protocols, operations that conform to the requirements of the PCI Express Base Specification. The term "PCI Express Base Specification", as used in the present application, includes all PCI Express standards, including but not limited to PCI Express Standard versions 1.0, 1.0a, and 1.1 published by PCI Signal Interest Group (PCI-SIG).

In the present embodiment, as illustrated in FIG. 3, switching device 300 is implemented as a four port switch. In another embodiment, switching device 300 includes sixteen or more ports enabled to communicate with external devices 310. In one embodiment, switching device 300 includes 15 ports downstream ports 308 and an upstream port 307. Upstream port 307 further includes ingress terminal 307I and egress terminal 307E. Ingress terminal 307I is an input terminal for receiving an incoming PCI Express communication packet from root complex 302. Egress terminal 307E is an upstream output port for sending out a communication packet routed through switching device 300 to root complex 302 or to another switching device located upstream.

Downstream ports 308 each include an ingress terminal 308I and an egress terminal 308E that are electrically coupled to switch core 305. Downstream ingress terminal 308I is used to receive communication packet 350 from external devices 310 and downstream egress terminals 308E send out communication packets to external devices 310. It is noted that, when external devices 310 are electrically connected to switching device 300, external devices 310 can send and receive PCI Express packets, through switching device 300 over PCI Express links 306, to each other without entailing upstream, root complex, time. At upstream port 307, the input terminal of routing device 10 is electrically connected to upstream ingress terminal 307I and the output terminal of routing device 10 is electrically connected to switch core 305. The output of the switch is electrically connected to egress terminal 307E of upstream port 307. Similarly, at each downstream port 308, the input terminal of routing device 10 is electrically connected to downstream ingress terminal 308I and the output terminal of routing device 10 is electrically connected to a switch of switch core 305. The output of that switch is electrically connected to egress terminal 308E of downstream port 308.

In one embodiment of the present invention, routing device 10, and its array of base address registers and control logic, is replicated at every port in switching device 300. In an alternative embodiment, however, a single implementation of the elements of routing device 10 is located with the switch core 305. In another embodiment, more than one implementation of the elements of routing device 10 is implemented, though not at every port in the switching device.

Referring still to FIG. 3, a communication packet 350 may be received at switching device 300 at upstream port 307 or at any of downstream ports 308. In the present embodiment, a communication packet 350 can be a data or other packet that is in compliance with the PCI Express standard. External devices 310 can be PCI Express devices or bridges to other types of devices. Upon receiving communication packet 350, control logic circuitry 105 determines whether the target address contained in communication packet 350 falls within the address range contained in any of the base address registers in the array of base address registers 101. If the target address contained in communication packet 350 is within the range of array of any of the base address registers 101, switching device 300 will forward the communication packet 350 to the port named in the base address register whose address range encompasses the target address.

In the present embodiment, switching device 300 is a single Integrated Circuit (IC) device that is implemented in a single semiconductor chip on which routing functions and logic of switching device 300 are implemented. This includes registers, comparators multiplexers and connection links described above. In practice, switching device 300 with base address matching logic element 103 can be implemented as a chipset which is a device coupled to a Central Processing Unit (CPU) to perform the desired system functionality. In another embodiment, switching device 300 can be implemented on an Application Specific Integrated Circuit (ASIC).

Figure 4:
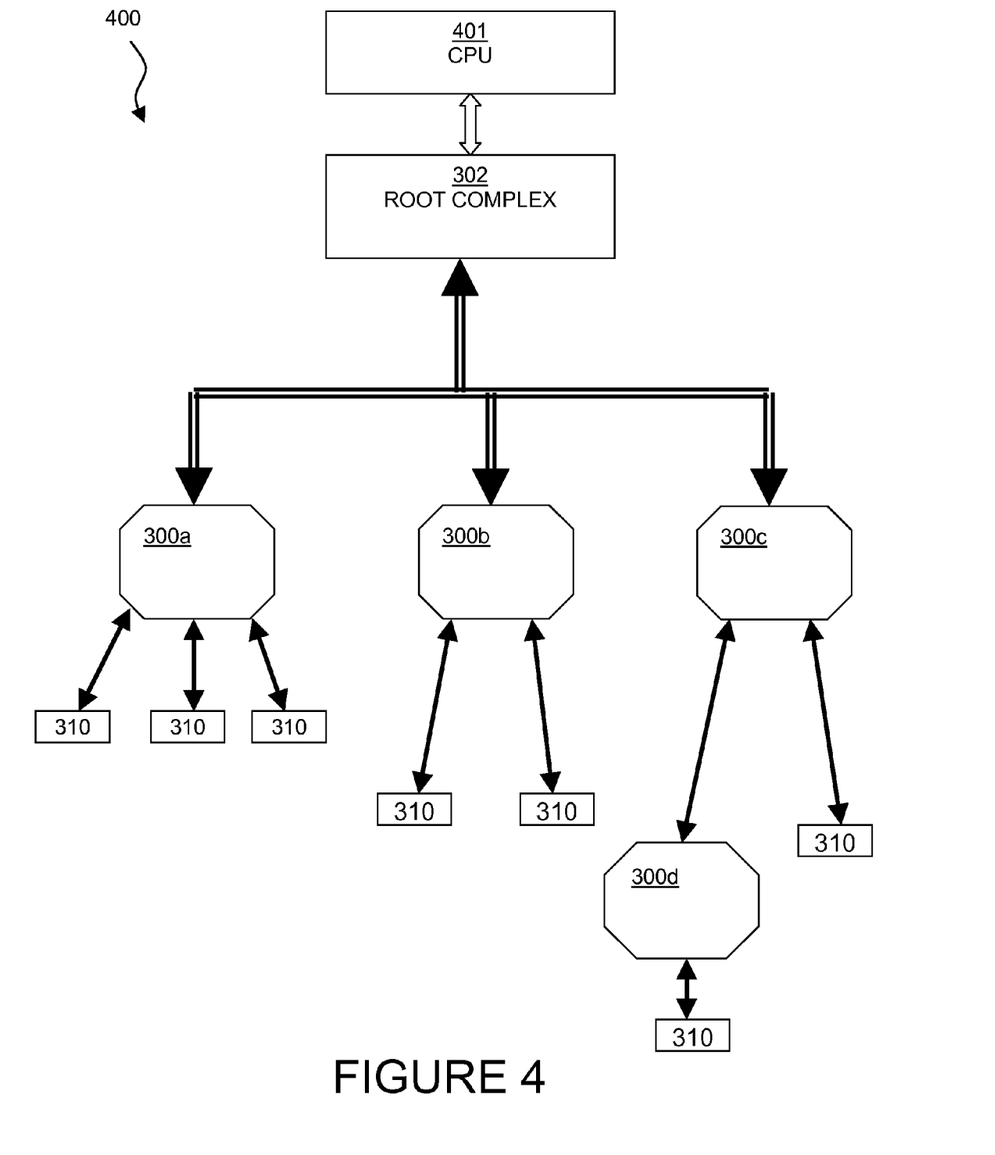
FIG. 4 illustrates a schematic diagram of a PCI Express system that includes the switching device of FIG. 3 and external devices in accordance with an embodiment of the present invention.

Now referring to FIG. 4, a schematic diagram of a typical PCI Express system 400 is shown that uses switching device 300 to connect external devices 310 with root complex 302 and with each other. Switching device 300 includes a routing device 10 that contains base address register array 101 and address matching device 103. In the embodiment that is shown in FIG. 4, switching device 300 with routing device 10 is implemented in a PCI Express system 400. PCI Express system 400 is a communication system which is typically found in computing system that includes a Central Processing Unit (CPU) 401, a root complex 302, switching device 300 and one or more external devices 310.

The elements of PCI Express system 400 interconnected by PCI Express link 306 are the root complex 302, the switching device 300, and the external devices 310. CPU 401 is electronically connected to root complex 302 but the link between them is not, in this embodiment, a PCI Express link. The heart of PCI Express system 400 is root complex 302. Root complex 302 is connected to PCI Express switching device 300 by PCI Express link 306. External devices 310 communicate to root complex 302, and thus CPU 401, via switching device 300. In PCI Express system 400, external devices 310 can independently communicate peer-to-peer with each other directly via switching device 300. PCI Express system 400 uses communication packets 350 to communicate to root complex 302, switching device 300, and external devices 310 connected thereto. Communication packets can be generated by the root complex 302, switching device 300, or external devices 310.

Referring further to FIG. 4, the controller of PCI Express communications in system 400 is either CPU 401 or root complex 302. In the point-to-point diagram shown in FIG. 4, CPU 401 can communicate to any of the external devices 310, even if the communication pathway between CPU 401 and an external device 310 includes PCI Express serial switch 300c and PCI Express serial switch 300d in the sequential relationship shown. CPU 401 can open up communication with that external device 310 via switching devices 300. CPU 401, through root complex 302, controls the operations of switching devices 300 and the PCI Express link 306 with external devices 310. Root complex 302 detects and initializes external devices 310, and controls PCI Express link 306 by default. Root complex 302 can retrieve information from external device 310. Upon receiving an instruction from root complex 302, switching devices 300 can route communications directly between external devices 310. External devices 310 can communicate with one another independently and in a peer-to-peer fashion without a master-slave control of either switching devices 300 or root complex 302.

External devices 310, it is noted, can be either endpoint devices or other switching devices such as switching devices 300, such as shown by switching devices 300c and 300d. Endpoint devices can be, for example, printers, digital cameras, add-in cards, USB memory sticks, etc. Other switching devices 300 are often not the end users of communication packets 350 sent to them; they forward the packets to other endpoint devices 310 to which they are connected. As discussed at length above, each external device 310 is assigned to a base address and a limit address. These base addresses are loaded and stored in a global address map and are retrieved as needed by root complex 302 or CPU 401. Root complex 302 then maps these base addresses to the arrays of base address registers 101. The base address contained in each base address register in the arrays of base address registers 101 defines the starting point and memory addresses that each external device 310 has been allocated in the global address map.

Referring again to FIG. 4, the purpose of PCI Express link 306 is to connect external devices 310 to root complex 302 so that the CPU 401, via root complex 302, can communicate with them. Each PCI Express link 306 is composed of one or more lanes, and each lane is capable of transmitting packets in both directions at once. This full-duplex communication is possible because each lane is itself composed of one pair of signals: send and receive.

Referring again to FIG. 4, upon power-up and enumeration process, the operating system, via root complex 302, interrogates the entire PCI Express system 400 by traversing through system topology and locates all external devices 310 that are connected to the switching device 300. After the configuration process is complete, each receiver interface of each external device 310 is prepared to monitor the integrity of new communication packet 350. A transaction layer packet (TLP) can move from one PCI Express link 306 to another PCI Express link 306, using routing information contained in its header.

Referring again to FIG. 4, as a new communication packet 350, in the form of a transaction layer packet (TLP), arrives at ports 307 or 308, switching device 300 checks for errors then determines whether to accept the traffic and use it internally, forward the traffic to the appropriate port 308, or reject the traffic because switching device 300 is neither the intended target nor an interface to it.

Figure 5:
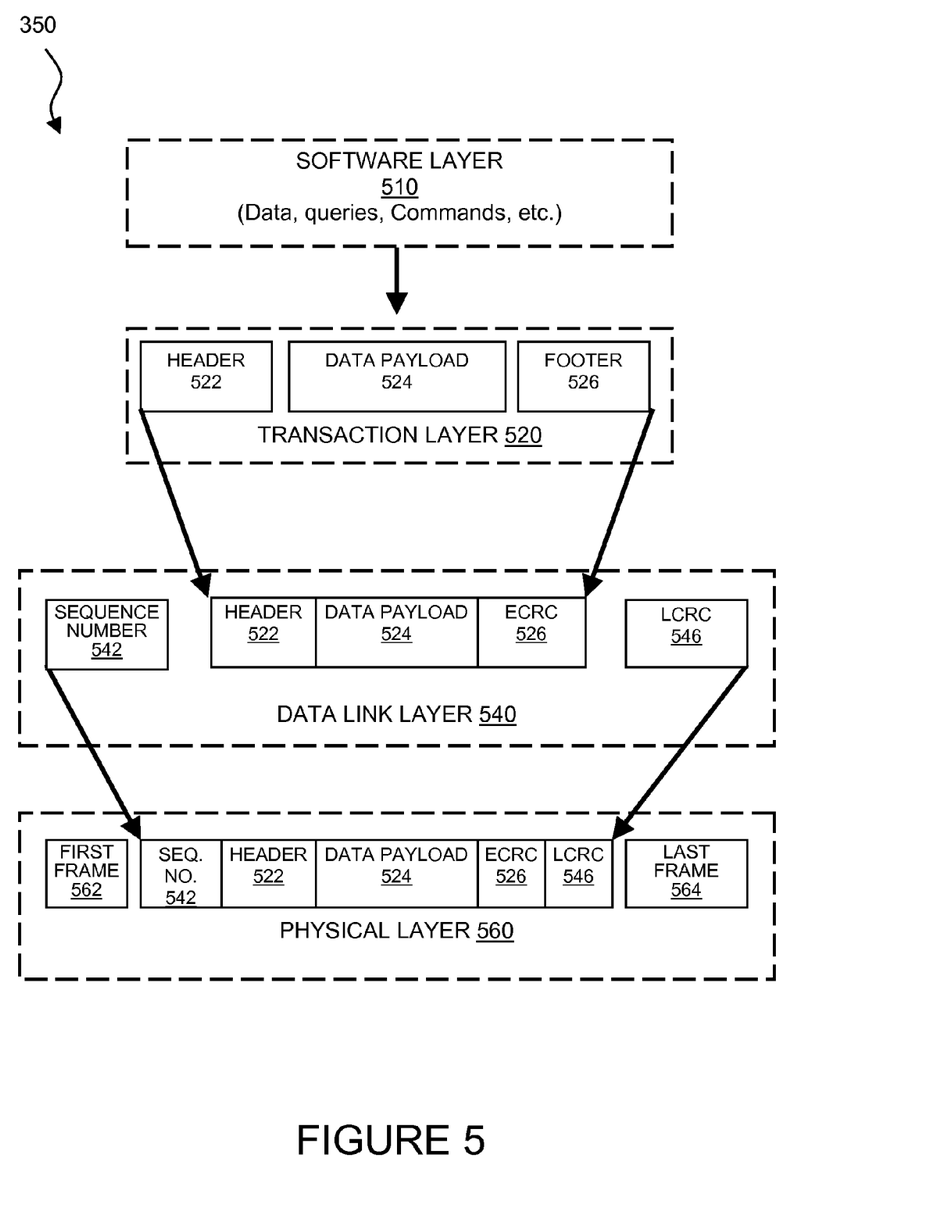
FIG. 5 illustrates a conceptual parsing of a communication packet in a PCI Express system in accordance with an embodiment of the present invention.

Referring now to FIG. 5, different abstract layers of a typical PCI Express communication packet 350 are illustrated. Communication packet 350 can include data, commands, a query or other communication that a software function, software layer 510 in this illustration, intends for some device in the system. A configuration command, reassigning base and limit addresses, it is noted, can be one type of communication packet 350. Data becomes the payload 524 of a data packet. In a configuration command, the payload is a new address or set of addresses for reconfiguration of a base address register in switching device 300.

Referring still to FIG. 5, a transaction layer 520, the operating system for example, applies a header 522 and, possibly, a footer 526, to the data payload 524. Header 522 includes a target address which can be a device address, a port name, or a bus number in the system. In the example of a configuration command packet, the target address is an address internal to switching device 400. Footer 526 is often an End-to-end Cycle Redundancy Checking (ECRC) sequence.

Transaction layer 520 ensures that communication packet 350 is properly routed to its intended destination and that it arrives intact. In the example of a communication packet 350 destined for an external device 310, transaction layer 520 ensures the integrity of communication packet 350 and that it passes intact through switching device 300.

Data link layer 540 is, in this embodiment, the point-to-point function, such as is implemented by switching device 300. The data link layer adds sequence number 542 and a Link Cycle Redundancy Check (LCRC) 546 to the communications packet. Physical layer 560 represents the transmission medium which is responsible for actually transmitting and receiving communication packet 350 across PCI Express link 306. Physical layer 560 adds a first frame 562 and a last frame 564 in addition to sequence number 542, LCRC 546, header 522, data payload 524, and ECRC 526. Link cyclical redundancy check (LCRC) 546 ensures integrity of packet 350 across PCI Express link 306.

It is noted that a switching device in a PCI Express environment can be connected with one or more switching devices at its downstream ports, as shown in FIG. 4, above. If, in this example, the target address of a communication packet 350 indicates a downstream external device and switching device 350 is not the recipient, switching device 300 forwards communication packet 350 to the downstream external device 310. A base address register associated with a downstream switch, it is noted, contains a base address and a limit address fully encompassing the ranges of addresses represented in the base address registers of the downstream switch.

If switching device 300 is not correctly in the path of communication packet 350, the packet is returned to the upstream egress terminal 307E subject to the rules for ordering and flow control for that port. If the target address contained in the header 522 of transaction layer packet 520 does not belong to the range of base addresses of upstream port 407, switching device 400 performs further comparisons and rejects the packet as an Unsupported Request (UR). Thus, transaction layer 540 and other layers carry information and ensure data integrity of communication packet 350 that is necessary to perform the routing process of routing device 10 in switching device 300.

In one embodiment of the present invention where PCI Express system 300 has more than one switching device 300 connected to it, to facilitate communications between two external devices 310 in different switching devices 300, communication packet 350 traverses from the originating external device 310, connected to one switching device 300 all the way up to the lowest common switch point. New communication packet 350 is then traverses down to the destination external device 310. When the source and target reside on different segments of PCI Express link 306, communication packet 350 must be routed up toward root complex 302 to the segment of PCI Express link 306 where the base address ranges of the source and the target external devices 310 intersect, and then routed down to the target external device 310. As a result, address based routing exploits the shortest paths that exist in a switched-packet interconnect fabric.

Figure 6:
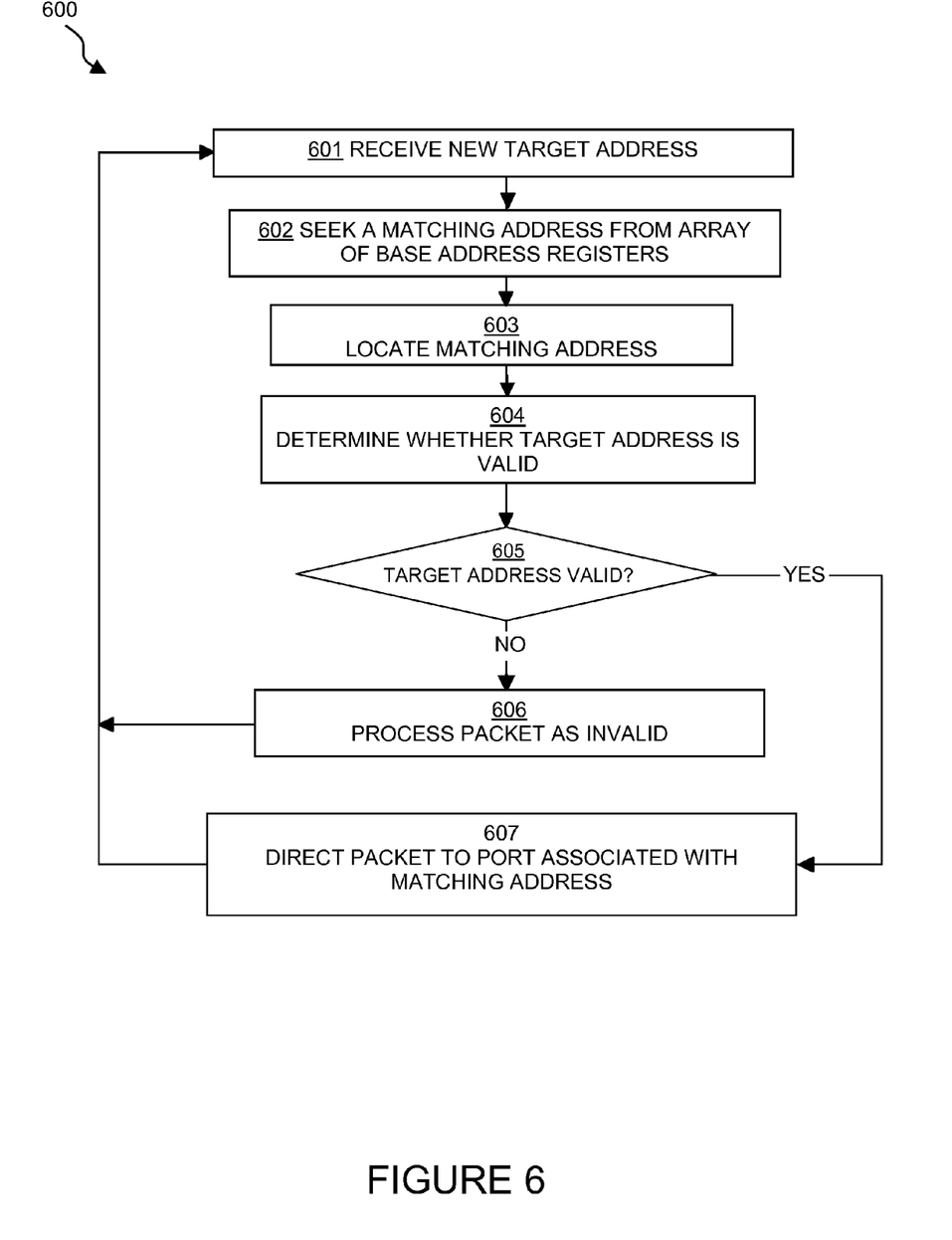
FIG. 6 illustrates a flow diagram of a method for concurrent matching limit check validation in a switching device in accordance with an embodiment of the present invention.

FIG. 6 illustrates a method for concurrent matching limit check validation in accordance with an embodiment of the present invention. Method 600, implemented by routing device 10 in switching device 300 (FIG. 3), begins by receiving a communication packet (350, FIG. 3) containing a new target address, 601. The target address can be a memory address, a pre-fetchable memory address or an I/O address, or a bus or device or function number. The new target address is received and held in a register/buffer 250 (FIG. 2).

A matching address is sought for the new target address in a set of sorted base addresses in an array of base address registers 602. This seeking is a less-than-or-equal-to search meaning that, in this embodiment of the present invention, the largest base address that is less than or equal to the target address is the matching address. In another embodiment, a matching address search is based on a greater-than searching through the array of sorted base addresses.

When a matching base address is located 603, the entire content of the base address register containing the matching address is read. The limit address associated with the matching address is read for comparison with the target address, in order to determine validity of the target address. The port identifier associated with the matching address is read in order to direct the packet, if the target address is determined to be valid.

At step 604, the limit address is compared with the target address to ensure the target address is valid. The comparison is a less-than-or-equal-to comparison, meaning that the target address is valid if it is numerically less than, or equal to, the limit address associated with the matching base address and it is not valid if it is greater than the limit address. In this embodiment of the present invention, the limit address is associated with the base address if it is contained in the same base address register as the matching address.

If, at 605, the target address is not valid, the packet is processed as an invalid packet 606. In this embodiment of the present invention, the packet is processed as invalid under the standards of PCI Express. In another embodiment, however, invalid packet processing includes discarding the packet.

If, at step 605, the target address is determined to be valid, the associated packet is directed to the port associated with the target address 607. In this embodiment, the port identifier associated with the matching base address is transmitted to the switch core 305 of the switching device 300. With the port identifier, switch core 305 is able to direct 607 the communication packet to the port associated with the matching base address. The port identifier can be a number, a port name, or a bus number associated with the port.

In this embodiment of the present invention, if the target address is numerically larger than the limit address associated with the matching base address found in step 603 above, the target address is determined to be invalid at step 606. The limit check multiplexer 152, by selection of an input taken from the outputs of limit check comparators 148-151, outputs a "false" indication. The "false" is a nullification signal that causes (204, FIG. 2) the handling of the associated packet as an invalid packet. It is noted here that a limit address can be identical to a base address.

In the present embodiment, when the target address is greater than the limit address associated with the matching base address, the packet is processed as an invalid packet and its routing nullified 606. The switching device is then ready to receive another packet.

A device and method have been disclosed for performing a concurrent limit address check validation in a switching device. The device includes a multiplexer that is enabled to select content from a base address register in an array of base address registers, a comparator enabled compare a base address in the content with a target address from a packet, and a comparator enabled to concurrently compare a limit address in the content with the target address and the output of the limit address comparator is enabled to inhibit transmission of the communication packet. The method includes receiving the target address, seeking and locating a matching base address in an array of base address registers, concurrently determining the target address to be valid by comparing it with a limit address associated with the matching base address, and nullifying the match if the target address is greater than the limit address.

By using a concurrent limit check validation as described herein, the method and apparatus of the present invention allow for quickly and accurately forwarding a communication packet to its intended destination inserting a new configuration for a base address register into an array of base address registers, in a pre-determined sorted order. Also, the concurrent limit check validation of the present invention allows for a relatively small increase in the number of comparators and multiplexers over other switching devices in order to reduce the latency incumbent in packet switching.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. An address check validation circuit in a switching device implemented in a system conforming to PCI Express standards, the system comprising a plurality of communication ports, each of said communication ports being electronically coupled to an external electronic device and each of said communication ports being associated with a base address, a limit address and a port identifier, the address check validation circuit comprising:

a base address register array comprising a plurality of base address registers, each base address register having content that includes the base address, the limit address and the port identifier associated with each of the plurality of communication ports, the plurality of base address registers in the base address register array are sorted into either a descending or ascending order;

a base address comparator electrically coupled to the base address register array to receive content of a base address register from the sorted base address register array and to receive a communication packet comprising a target address, said base address comparator operable to compare said base address register to said target address following either the descending or ascending order of the sorted base address register array to identify a matching base address in the base address register array; and a limit address comparator electrically coupled to receive said target address and said limit address, said limit address comparator functioning concurrently with said base address comparator for generating output that indicates whether said target address is valid, and if said target address is valid, said limit address comparator for transmitting a port identifier associated with the matching base address to the switching device.

2. The address check validation circuit described in claim 1, further comprising:

a register content multiplexer, enabled to select said content of a base address register in the array of base address registers;

wherein said base address comparator is electrically coupled to said register content multiplexer and is electrically coupled to said limit address comparator.

3. The address check validation circuit described in claim 2, wherein said base address comparator is enabled to take said limit address as a first input from said register content multiplexer and said target address as a second input, wherein the output of said limit address comparator indicates whether said target address is less than or equal to said limit address.

4. The address check validation circuit described in claim 1, wherein said base address registers in the base address register array are sorted into a descending order and wherein said base address comparator is a greater-than-or-equal-to comparator.

5. The address check validation circuit described in claim 1, wherein said base address registers in the base address register array are sorted into a ascending order and wherein said limit address comparator is a less-than-or-equal-to comparator.

6. The address check validation circuit described in claim 1, further comprising a port identity multiplexer electrically coupled to the output of said base address comparator and coupled to the output of other base address comparators, said port identity multiplexer enabled to select a port identity of a base address that matches said target address.

7. The address check validation circuit described in claim 1, further comprising a limit check multiplexer electrically coupled to the output of said base address comparator and enabled to select an output from said limit address comparator and other limit address comparators that indicates the validity of said base address that matches said target address.

8. The address check validation circuit described in claim 7, wherein the output of said limit check multiplexer directs the further processing of said target address validity.

9. The address check validation circuit described in claim 1, wherein said target address is included in a communication packet, said communication packet conforming to the standards for PCI Express.

* * * * *